March 3, 1953  H. F. DIECKHOFF  2,630,286
SUPPORTING DEVICE
Filed Sept. 30, 1949
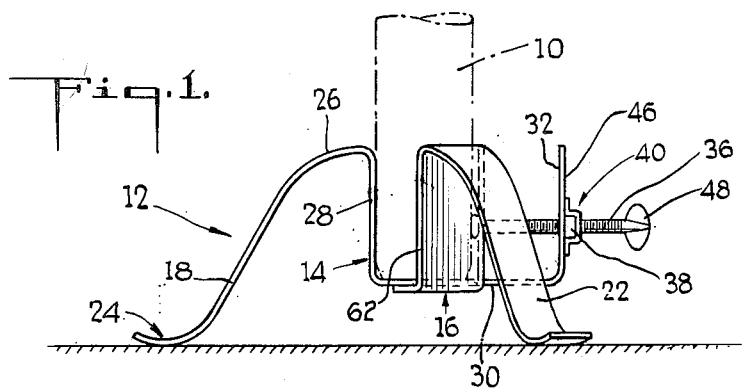
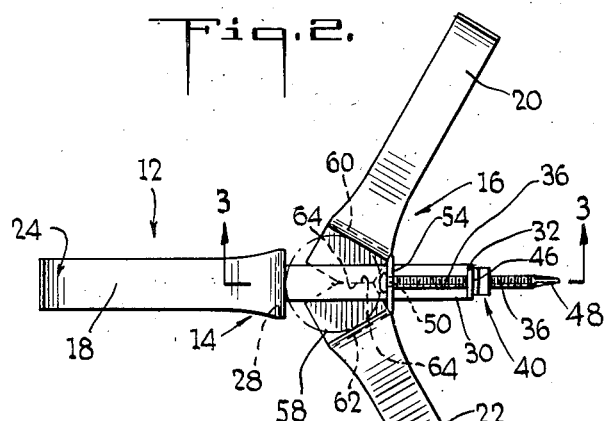
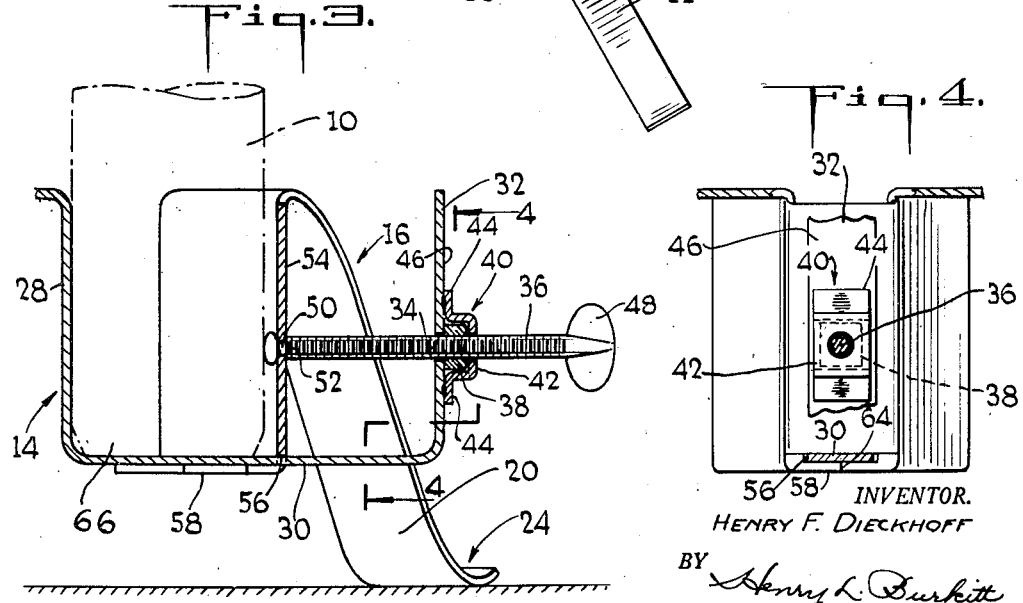
INVENTOR.
HENRY F. DIECKHOFF
BY Henry L. Burkitt
ATTORNEY Patented Mar. 3, 1953

2,630,286

UNITED STATES PATENT OFFICE 2,630,286

SUPPORTING DEVICE

Henry Fred Dieckhoff, Brooklyn, N. Y.

Application September 30, 1949, Serial No. 118,962

11 Claims. (Cl. 248—44)

This invention relates to a supporting device, particularly adapted for supporting an upright, such as a pole or tree trunk, as, for instance, a Christmas tree, by engaging it at its end.

Different devices have been utilized to maintain a Christmas tree in upright position by engaging it at its trunk end. Many of the devices are so constructed as necessarily to be unbalanced, in use, with the trunk not centered in the device. Many of these devices depend upon a set screw which engages into the wood of the tree to hold the trunk in position. Many of the devices take the form of a simple receptacle the bottom of which rests directly upon the floor; such devices generally provide little if any resistance against swaying of the tree.

It is an object of the invention to provide a device for supporting uprights such as Christmas trees, wherein the weight of the tree itself has a positive function in securely clamping the tree trunk solidly into the device.

It is an object of the invention to provide an upright-supporting structure capable of retaining tree trunks of varying diameters, and of adjustably clamping such different trunks by a single device substantially to center them with relation to the device.

It is an object of the invention to provide a device of the type indicated wherein the resiliency of the material used in making the device has a function in positively centering the tree trunk with relation to the base of the device and as a result of such centering, more firmly to secure the trunk with relation to the device itself.

It is an object of the invention to provide a device of the character indicated, which is simple in its manufacturing details, which may be assembled without requiring any particular skill, and which functions effectively for the purpose of positively and stably supporting a tree trunk of substantial weight.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which is disclosed such a practical construction, Fig. 1 is a front elevational view of a device embodying features of the invention, the trunk of the tree being shown in dot-and-dash lines as assembled therewith;

Fig. 2 is a plan view of the device shown in Fig. 1;

Fig. 3 is a vertical cross-sectional view, substantially on the line 3—3 of Fig. 2, and to enlarged scale, illustrating details of the construction; and Fig. 4 is a detail elevational and sectional view, as seen from the line 4—4 of Fig. 3, parts being broken away to illustrate the assembly of the threaded rod and nut.

On Fig. 1, the trunk 10 of a tree, shown by dot-and-dash lines, is illustrated as assembled with a device 12 designed to embody features of the invention. Device 12 may comprise a pair of sections 14 and 16 which may be made from heavy strap metal. These sections are shown as providing legs or footings 18, 20 and 22. While three legs or footings are shown, it can be understood that section 14, shown with but one leg, may have two or more legs, and that section 16 may have one or more than two legs.

Considering section 14 alone, it is seen that this section consists substantially of a single piece of metal which has been bent to provide footing 18. The metal, at the end of footing 18, is bent to form a curved nose 24 to rest upon the floor without cutting. From nose 24, the strap metal extends upwardly to its uppermost position or bend 26, from which it bends downwardly and may take the form of a wall 28. Wall 28 may be flat, or, if desired, a rounded contouring may be formed therein.

The strap metal, at the bottom of wall 28, is bent so that, when the assembly is in use, this bottom strap 30 will be substantially parallel to the floor. At the end of strap 30, there is a terminal upwardly bent end 32.

In end 32 is provided an opening 34 through which may be extended a threaded rod 36. This rod has threaded engagement with a nut 38 loosely held within a cage 40 formed by bending a cross-shaped strap 42 so that the arms 44 have footings which may be secured to face 46 of end 32, as, for instance, by tack welding. Strap 42 has a large opening to coincide with opening 34 and the threaded opening in nut 38. However, nut 38 has a limited freedom of movement within the cage. Member 36 is provided at one end with wings 48 for its proper manipulation; at its other end, the member has a reduced portion 50 to fit into an opening 52 in wall 54 of section 16. Member 36, beyond reduced portion 50, is peined over to retain it in position with relation to wall 54, and yet permit it to turn on its axis.

Strap 30 extends through a slot 56 at the bottom level of wall 54. Preferably, at that position, strap 30 rests upon wings 58 which may be provided by integrally bending the metal out of walls 60 and 62 of section 16. In the case of section 16, a single piece of metal has been bent to provide legs or footings 20 and 22, wall 54 and walls 60 and 62. Each of legs or footings 20 and 22 is formed substantially in the same manner as leg 18; however, in forming walls 60 and 62, wings 58 may be formed integrally therewith.

Between walls 60 and 62, wall 54 is formed for the reception of member 36. Wings 58 may be so formed as to abut at their edges 64. They may be left free of each other at this position; if desired, they may be welded together. If section 14 is constructed with two legs or footings and two walls, strap 30 and its upwardly bent end 32 would be formed from the equivalent of wall 54.

When a tree trunk 10 is assembled in the receptacle 66 formed by the assembly of sections 14 and 16, that is, by passing strap 30 through slot 56 (nut 38 and its cage 40 may be assembled after strip 30 has been assembled), walls 28, 60 and 62 will be caused to approach each other by turning wings 48. This adjustment may be completed in great part before the tree trunk is set into the receptacle. In any case, the tightening will effect positive clamping of walls 28, 60 and 62 against the tree trunk. This operation also serves to center the trunk with relation to the positions where the device rests on footings 18, 20 and 22. As the weight of the tree comes to bear on strap 30 and wings 58, the whole structure, that is, walls 28, 60 and 62, together with the strap metal supporting these walls, will move downwardly. The weight is now borne on the noses 24 of the respective footings. The fulcruming of the entire structure on these noses will cause the bends 26 to tend to move inwardly, biting into the tree trunk more positively to anchor the device to the tree trunk and to retain it in position.

When it is desired to separate the trunk from the device, it is necessary only to loosen member 36 by turning wings 48. When sufficient release has been effected, the tree trunk is lifted from receptacle 66.

Many other changes could be effected in the particular constructions, and in the methods of use and construction, and in specific details thereof, hereinbefore set forth, without substantially departing from the invention intended to be defined herein, the specific description being merely of an embodiment capable of illustrating certain principles of the invention.

What is claimed as new and useful is:

1. A device for supporting an upright such as a pole or tree trunk, the device comprising a pair of nested sections for forming a receptacle for the end of the upright, the nested sections having means for interlocking each of the sections with the other, the interlocking means providing means for guiding the sections in sliding engagement with each other, the portions of the interlocked sections in sliding engagement with each other providing a bottom for the receptacle, means for adjusting the position of the sections with relation to each other to vary the size of the bottom to accommodate uprights of varying cross-section, each of the sections having a resilient footing extending laterally away from the interlocked means, the sections being constructed so that, when the load of an upright is imposed upon the device, the footings will force the sections positively to grip the upright.

2. A device for supporting an upright such as a pole or tree trunk, the device comprising a pair of sections, each of the sections having wall-defining means, the sections having interlocked portions for retaining the sections associated to form a receptacle, one of the interlocked portions forming a continuous, substantially uninterrupted bottom for the receptacle to receive the end of the upright, the wall-defining means co-operating with the interlocking means to form said receptacle to receive the end of the upright, means for adjusting the position of the sections and the interlocking means with relation to each other to vary the size of the bottom, each of the sections having a footing, the footings, under the load of an upright imposed upon the device, biasing the wall-defining means positively to grip the upright in the receptacle.

3. A portable device for retaining in substantially upright position an upright such as a pole or the trunk of a tree, the device including a pair of members, the members being formed from resilient material, each member having the material thereof shaped to provide a wall and an integrally formed extended foot, means on one member for engagement with means on the other member for retaining the members in association with each other so that said walls define a receptacle, the engagement means providing means for guiding the members for movement with relation to each other and providing a bottom for the receptacle, and adjusting means for fixing the positions of the walls with relation to each other to determine the transverse dimensions of the upright capable of being received by the device.

4. A portable device for retaining in substantially upright position an upright such as a pole or the trunk of a tree, the device including a pair of members, the members being formed from sheet metal, each member being shaped to provide a wall-defining section integrally formed with a downwardly extending resilient foot, the wall-defining section of one member having an opening therethrough, the other member having a projection therefrom extending through said opening for retaining the members in association with each other to define a receptacle but for movement with relation to each other, and adjusting means for fixing the positions of the sections with relation to each other to determine the transverse dimensions of the upright capable of being received by the device, the wall-defining sections and the feet being associated so that the load on the feet will cause them to force the wall-defining sections inwardly to engage the upright located in the receptacle.

5. A portable device for retaining in substantially upright position an upright such as a pole or the trunk of a tree, the device including a pair of members, the members being formed from sheet metal, each member being shaped to provide a wall-defining section integrally formed with a downwardly extending resilient foot, the wall-defining section of one member having a slot formed adjacent the bottom thereof, the other member having a strap extending therefrom through said slot for retaining the members in association with each other to define a receptacle but for movement with relation to each other, and adjusting means for fixing the positions of the sections with relation to each other to determine the transverse dimensions of the upright capable of being received by the device, the wall-defining sections and the feet being associated so that the load on the feet will cause them to force the wall-defining sections inwardly to engage the upright located in the receptacle.

6. A portable device for retaining in substantially upright position an upright such as a pole or the trunk of a tree, the device including a pair of members, the members being formed from sheet metal, each member being shaped to provide a wall-defining section integrally formed with a downwardly extending resilient foot, the wall-defining section of one member having a slot formed adjacent the bottom thereof, the wall-defining section of the other member having a strap integrally formed with and extending from the bottom edge thereof through said slot for retaining the members in association with each other to define a receptacle but for movement with relation to each other, and adjusting means for fixing the positions of the sections with relation to each other to determine the transverse dimensions of the upright capable of being received by the device, the wall-defining sections and the feet being associated so that the load on the feet will cause them to force the wall-defining sections inwardly to engage the upright located in the receptacle.

7. A portable device for retaining in substantially upright position an upright such as a pole or the trunk of a tree, the device including a pair of members, the members being formed from sheet metal to define a wall-defining section integrally formed with a downwardly extending resilient foot, the wall-defining section of one member having a slot formed adjacent the bottom thereof, the wall-defining section of the other member having a strap integrally formed with and extending from the bottom edge thereof through said slot for retaining the members in association with each other but for movement with relation to each other, and means extending from the strap to the first-named wall-defining section for fixing the positions of the sections with relation to each other to determine the transverse dimensions of the upright capable of being received by the device.

8. A portable device for retaining in substantially upright position an upright such as a pole or the trunk of a tree, the device including a pair of members, the members being formed from sheet metal to define a wall-defining section integrally formed with a downwardly extending resilient foot, the wall-defining section of one member having a slot formed adjacent the bottom thereof, the wall-defining section of the other member having a strap integrally formed with and extending from the bottom edge thereof through said slot for retaining the members in association with each other but for movement with relation to each other, the free end of the strap being bent out of the plane of the body of the strap to provide a wall, means carried by the wall and extending to the first-named wall-defining section for fixing the positions of the sections with relation to each other to determine the transverse dimensions of the upright capable of being received by the device.

9. In combination, a pair of members formed from sheet metal to provide complementary cup-forming sections, means extending from the sections to provide resilient footings for the sections, a strap integrally formed with one section and extending through an opening in the other section for retaining the sections in cup-forming relation and for movement relatively to each other, and means for limiting the sections to a position for forming a cup to receive the end of an upright such as a pole or trunk of a predetermined dimension.

10. In combination, a pair of members formed from sheet metal to provide complementary cup-forming sections, means extending from the sections to provide resilient footings for the sections, a strap integrally formed with one section and extending through a slot in the other section for retaining the sections in cup-forming relation and for movement relatively to each other, the strap providing means to retain means to extend therefrom and to engage the other section for limiting the sections to a position for forming a cup to receive the end of an upright such as a pole or trunk of a predetermined dimension.

11. In combination, a pair of members formed from sheet metal to provide complementary cup-forming sections, means extending from and integrally formed with the sections to provide resilient footings for the sections, a strap integrally formed with one section and extending through a slot in the other section for retaining the sections in cup-forming relation and for movement relatively to each other, the strap providing means to retain means to extend therefrom and to engage the other section for limiting the sections to a position for forming a cup to receive the end of an upright such as a pole or trunk of a predetermined dimension, the footing providing means to press the sections tightly into engagement with the upright engaged therebetween.

HENRY FRED DIECKHOFF.

REFERENCES CITED

The following references are of record in the file of this patent:

UNITED STATES PATENTS

| Number | Name | Date |
|---|---|---|
| 280,851 | Pannster | July 10, 1883 |
| 774,497 | Rompel | Nov. 8, 1904 |
| 1,457,820 | Cleveland | June 5, 1923 |
| 2,485,233 | Cima | Oct. 18, 1949 |